United States Patent
Johnston

(10) Patent No.: US 10,208,586 B2
(45) Date of Patent: Feb. 19, 2019

(54) TEMPERATURE SENSING USING DISTRIBUTED ACOUSTIC SENSING

(71) Applicant: William Johnston, Blacksburg, VA (US)

(72) Inventor: William Johnston, Blacksburg, VA (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 1108 days.

(21) Appl. No.: 14/521,010

(22) Filed: Oct. 22, 2014

(65) Prior Publication Data

US 2015/0146759 A1    May 28, 2015

Related U.S. Application Data

(60) Provisional application No. 61/908,527, filed on Nov. 25, 2013.

(51) Int. Cl.
| | | |
|---|---|---|
| E21B 47/12 | (2012.01) | |
| E21B 47/14 | (2006.01) | |
| G01K 11/32 | (2006.01) | |
| E21B 47/06 | (2012.01) | |
| G01K 11/22 | (2006.01) | |

(52) U.S. Cl.
CPC .......... *E21B 47/065* (2013.01); *E21B 47/123* (2013.01); *E21B 47/14* (2013.01); *G01K 11/22* (2013.01); *G01K 11/32* (2013.01)

(58) Field of Classification Search
CPC ....... E21B 47/14; E21B 47/065; E21B 47/123
See application file for complete search history.

(56) References Cited

U.S. PATENT DOCUMENTS

| | | |
|---|---|---|
| 2003/0094281 A1 | 5/2003 | Tubel |
| 2011/0088462 A1 | 4/2011 | Samson et al. |
| 2011/0280103 A1 | 11/2011 | Bostick, III |

FOREIGN PATENT DOCUMENTS

| | | |
|---|---|---|
| WO | 2009056855 A1 | 5/2009 |
| WO | 2012114067 A1 | 8/2012 |

OTHER PUBLICATIONS

International Search Report and Written Opinion; International Application No. PCT/US2014/062100; International Filing Date: Oct. 24, 2014; dated Feb. 6, 2015; 13 pages.
Li, et al., "High Spatial Resolution Distributed Fiber Optic Technique for Strain and Temperature Measurements in Concrete Structures"; International Workshop on Smart Materials, Structures NDT Canada 2013 Conference; Oct. 7-10, 2013; 11 pages.

*Primary Examiner* — Janet L Suglo
(74) *Attorney, Agent, or Firm* — Cantor Colburn LLP

(57) ABSTRACT

An embodiment of a method of measuring temperatures includes: taking distributed acoustic sensing (DAS) measurement data by transmitting interrogation signals into an optical fiber disposed in an environment of interest, and receiving reflected signals over a selected time period from the optical fiber; processing the DAS measurement data to separate components of the DAS data associated with changes in temperature; and generating a temperature change profile for the selected time period based on the separated components of the DAS data.

20 Claims, 2 Drawing Sheets

TEMPERATURE SENSING USING DISTRIBUTED ACOUSTIC SENSING

CROSS REFERENCE TO RELATED APPLICATION

This application claims the benefit of an earlier filing date from U.S. Provisional Application Ser. No. 61/908,527 filed Nov. 25, 2013, the entire disclosure of which is incorporated herein by reference.

BACKGROUND

Fiber-optic sensors have been utilized in a number of applications, and have been shown to have particular utility in sensing parameters in harsh environments. Optical fibers have utility in various downhole applications including communication and measurements, e.g., to obtain various surface and downhole measurements, such as pressure, temperature, stress and strain.

Distributed Temperature Sensing (DTS) systems utilize fiber optic cables or other devices capable of measuring temperature values at multiple locations along the length of a wellbore. DTS can be used to measure, for example, a continuous temperature profile along the wellbore by measuring temperature over many minutes of integration time.

SUMMARY

An embodiment of a method of measuring temperatures includes: taking distributed acoustic sensing (DAS) measurement data by transmitting interrogation signals into an optical fiber disposed in an environment of interest, and receiving reflected signals over a selected time period from the optical fiber; processing the DAS measurement data to separate components of the DAS data associated with changes in temperature; and generating a temperature change profile for the selected time period based on the separated components of the DAS data.

An embodiment of a system for measuring temperatures includes: a distributed acoustic sensing (DAS) measurement device including an optical fiber configured to be disposed in an environment of interest and an interrogation unit configured to transmit interrogation signals and receive reflected signals over a selected time period from the optical fiber; and a processor configured to receive DAS measurement data generated based on the reflected signals. The processor is configured to perform: processing the DAS measurement data to separate components of the DAS data associated with changes in temperature; and generating a temperature change profile for the selected time period based on the separated components of the DAS data.

BRIEF DESCRIPTION OF THE DRAWINGS

Referring now to the drawings, wherein like elements are numbered alike in the several Figures.

DETAILED DESCRIPTION

Apparatuses, systems and methods for temperature measurement are provided. An embodiment of a temperature measurement apparatus includes a distributed acoustic sensor (DAS) configured to be disposed in a borehole in an earth formation. An exemplary DAS sensor includes an optical fiber configured as a continuous interferometer that is capable of measuring both acoustic signals and temperature. For example, a DAS optical fiber is configured to detect very small temperature changes, and may be used in real time to, e.g., monitor downhole conditions and control an energy industry operation. Although embodiments described herein include measurements of downhole environments, the embodiments could be applied to any environment of interest, including surface environments.

In one embodiment, a downhole monitoring and/or measurement system includes a temperature measurement assembly configured to measure temperature using at least one DAS optical fiber. A light source such as a tunable laser is configured to transmit an interrogation signal into the fiber and receive reflected signals that are analyzed using an optical time domain reflectometer (OTDR) or an optical frequency domain reflectometer (OFDR) assembly. The system is capable of measuring acoustic sounds and vibrations and is also capable of measuring small temperature changes. For example, the reflectometer assembly measures temperature changes by separating low frequency oscillations in DAS signals and analyzing these oscillations to estimate temperature changes.

In one embodiment, a system and method is configured to measure absolute temperature based on an absolute temperature sensor device or devices, and based on a DAS sensor. For example, the system includes a distributed temperature sensor (DTS) assembly and a DAS assembly. The DTS and DAS assemblies may use separate optical fibers or transmit and receive signals in the same optical fiber. The system is configured to generate temperature change data based on DAS measurement data, and generate relatively high resolution absolute temperature data based on the absolute temperature measurements and the temperature change data.

Figure 1:
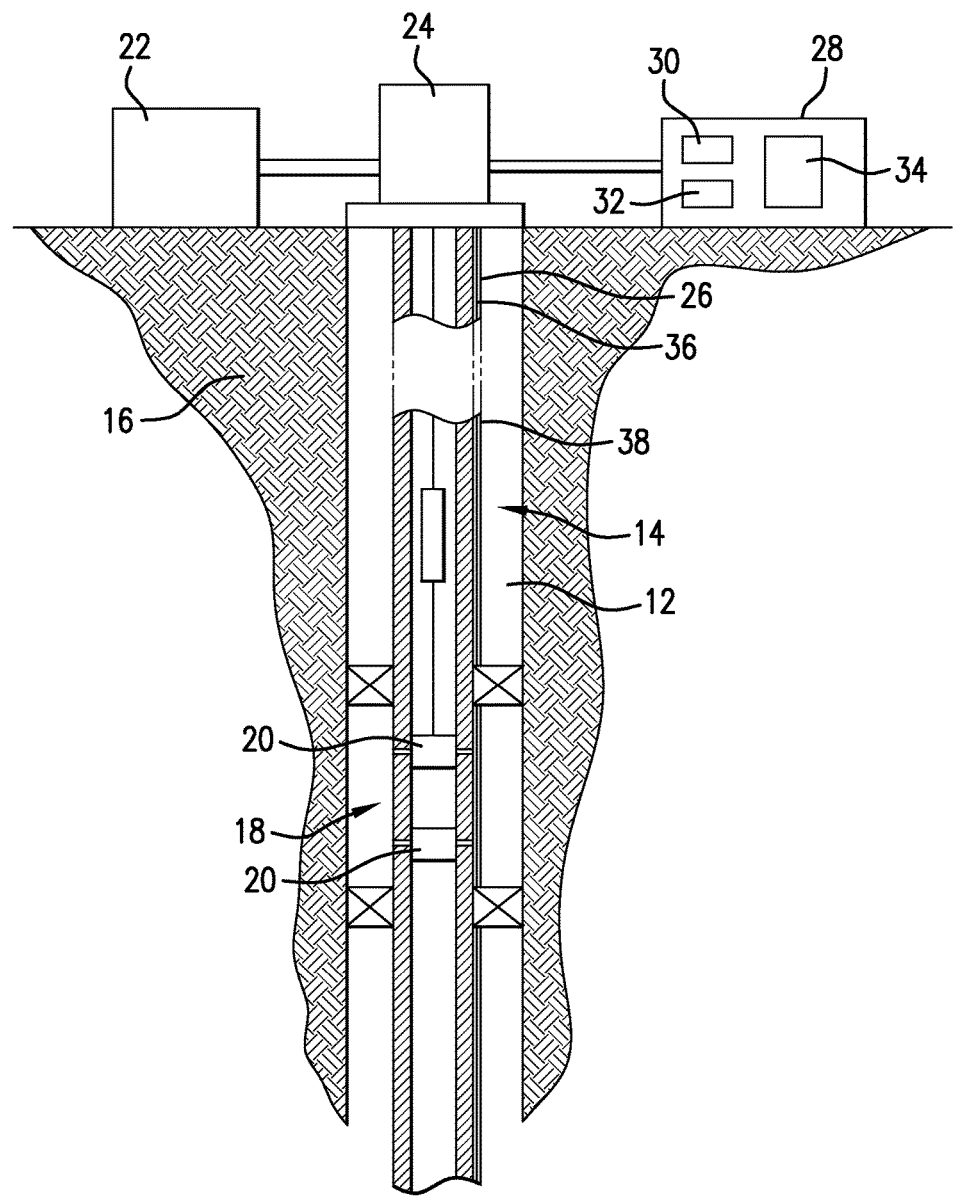
FIG. 1 is a cross-sectional view of an embodiment of a downhole drilling, monitoring, evaluation, exploration and/or production system.

Referring to FIG. 1, an exemplary embodiment of a downhole drilling, monitoring, evaluation, stimulation and/or production system 10 associated with a borehole 12 is shown. A borehole string 14 is disposed in the borehole 12, which penetrates at least one earth formation 16 for facilitating operations such as drilling, production and making measurements of properties of the formation 16 and/or the borehole 12. The borehole string 14 includes any of various components to facilitate subterranean operations. The borehole string 14 is made from, for example, a pipe, multiple pipe sections or flexible tubing. The borehole string 14 includes for example, a drilling system and/or a bottomhole assembly (BHA).

The system 10 and/or the borehole string 14 include any number of downhole tools 18 for various processes including drilling, hydrocarbon production, and formation evaluation (FE) for measuring one or more physical quantities in or around a borehole. Various measurement tools may be incorporated into the system 10 to affect measurement regimes such as wireline measurement applications or logging-while-drilling (LWD) applications.

In one embodiment, the borehole string 14 is configured as a production string and includes a tool 18 configured as a stimulation assembly as part of, for example, a bottomhole assembly (BHA). The stimulation assembly is configured to inject stimulation fluids such as hydraulic fracturing fluids and/or acid stimulation fluids into the formation. Stimulation fluids may include any suitable fluid used to reduce or eliminate an impediment to fluid production.

For example, the system 10 includes one or more injection assemblies 20 configured to control injection of stimulation fluid and direct stimulation fluid into one or more production zones in the formation. Each injection assembly 20 includes, e.g., one or more injection or flow control devices configured to direct stimulation fluid from a conduit in the string 14 to the borehole 12. A fluid source 22 may be coupled to a wellhead 24 and injected into the borehole string 14.

In one embodiment, the stimulation fluid is an acid stimulation fluid. Exemplary acid stimulation fluids include acids such as hydrochloric acid (HCL) or mud acid. Acid stimulation is useful for, e.g., removing the skin on the borehole wall that can form when a wellbore is formed in a limestone formation.

The system 10 also includes one or more fiber optic components configured to perform various functions in the system 10, such as communication and sensing various parameters. An exemplary fiber optic component is a fiber optic sensor 26 configured to measure downhole properties such as temperature, pressure, stress, strain, vibration and deformation of downhole components such as the borehole string 14 and the tools 18. The optical fiber sensor 26 includes at least one optical fiber having one or more sensing locations disposed along the length of the optical fiber sensor 26. Examples of sensing locations include fiber Bragg gratings (FBG), mirrors, Fabry-Perot cavities and locations of intrinsic scattering. Locations of intrinsic scattering include points in or lengths of the fiber that reflect interrogation signals, such as Rayleigh scattering locations. The optical fiber sensor 26 can be configured as a cable or other elongated member, and may include additional features such as strengthening and/or protective layers or members, and additional conductors such as electrical conductors and additional optical fibers for sensing and/or communication. Although the optical fiber sensor is depicted on the production tubing, it is not so limited, as the optical fiber sensor may be located anywhere within the well bore, be cemented into the casing, or deployed temporarily through coiled tubing or wireline.

The system 10 includes an optical fiber monitoring system configured to interrogate the optical fiber sensor 26 to estimate a parameter (e.g., vibration/acoustic signals, temperature and/or pressure) in the borehole environment. In one embodiment, the monitoring system is configured to detect and/or measure acoustic signals caused by, e.g., fluid injection, fracture formation and/or vibration of downhole components. The monitoring system is also configured to estimate temperature values, including absolute temperature values and relative temperature changes.

In one embodiment, the monitoring system includes an interrogation unit 28 configured to transmit an electromagnetic interrogation signal into the optical fiber sensor 26 and receive a reflected signal from one or more locations in the optical fiber sensor 26. The interrogation unit 28 includes components such as a signal source 30 (e.g., a pulsed light source, LED, laser, etc.) and a signal detector 32. In one embodiment, a processor 34 is in operable communication with the signal source 30 and the detector 32 and is configured to control the source 30 and receive reflected signal data from the detector 32. An example of an interrogation unit is a reflectometer unit that includes, for example, an OFDR and/or OTDR type interrogator.

In one embodiment, the optical fiber sensor 26 is configured as a distributed acoustic sensor (DAS), which includes at least one DAS optical fiber 36, such as a single mode fiber, coupled to the interrogation unit 28. Distributed acoustic sensing (DAS) uses pulses of light from a highly coherent electromagnetic source (e.g., laser) to measure vibrations sensed by an optical fiber such as the DAS fiber 36. Light in the fiber naturally undergoes Rayleigh scattering as it propagates down the fiber and light scattering from different sections of the fiber can interfere with each other. By looking at the time variations in these interference signals, DAS is typically used to measure the acoustic vibrations sensed by a fiber as it undergoes time varying strain.

In one embodiment, the interrogation unit 28 (or other processing device configured to receive interferometer data) is configured to estimate temperature based on the DAS signals. The temperature estimates may be estimates of absolute temperature or of relative temperature changes. Temperature changes can be measured in a small time scale, e.g., on the order of seconds.

For a Fabry-Perot cavity or an interferometer with two weakly reflecting points, both of which are referred to as an interferometer, the interference signal R has the following form:

$$R \sim \left(\sin\frac{2\pi nl}{\lambda}\right)^2$$

where n is the index of refraction of the fiber at a particular wavelength and temperature, l is the interferometer length, and $\lambda$ is the wavelength of the interrogation signal.

If, instead of two reflection points, the signal is averaged over the length of fiber illuminated by a laser pulse, then the random locations of the scatter sites will still produce oscillatory interference signals but they will not have perfectly sinusoidal behavior. The character of the interference signal may be improved by placing discrete reflection points or Bragg gratings within the fiber.

The processor is configured to process and analyze the interference signal to estimate temperature variations based on changes in the interference due to the temperature changes. The signal is analyzed based on the recognition that the index of refraction of the fiber varies according to temperature.

For example, if $n_0$ represents the index of refraction of the fiber at 0° C., then the index of refraction at other temperatures can be approximated by:

$$n(T) \approx n_0 + \frac{dn}{dT}T$$

where T is the fiber temperature and dn/dT is approximately $10^{-5}$/degrees C in the optical fiber. This temperature dependence of the optical fiber results in a temperature dependence of a DAS signal.

This temperature dependence manifests as a low frequency oscillation in the DAS signals. A "low frequency" oscillation as described herein refers to a component of the DAS signal that has a period of about 0.1 second or greater for an interferometer length of a few meters. For longer interferometers lengths, corresponding to longer laser pulses in an OTDR based system, the period of these low frequency oscillations may be shorter than 0.1 second.

In one embodiment, the temperature difference required to shift the signal by one interferometer fringe is about 0.15° C./L or up to a factor of two. For reasonable laser pulse widths this allows for the real time monitoring of well temperature changes. This is different than a traditional distributed temperature sensor which measures the (roughly) absolute temperature of the well only after integrating a signal for many minutes.

By using the phase of the low frequency components of the DAS signal, the temperature changes of the well can be estimated and monitored in real time and with much higher precision than is possible with a short DTS measurement. The processor is configured to process DAS signal data to separate out the low frequency oscillations present in DAS signals.

In one embodiment, temperature changes estimated using DAS signal data are used in conjunction with temperature measurement data taken from one or more other temperature measurement devices or systems. Exemplary temperature measurement devices include discrete temperature sensors and distributed temperatures sensors (DTS).

The system 10 may include a DTS assembly that includes at least one optical fiber 38 (also referred to as a DTS fiber). The DTS fiber can be coupled to a separate interrogation unit or other device for transmitting and receiving signals, or can be coupled to the interrogation unit 28. DTS traces generated using the DTS fiber 38 can be combined with DAS temperature data in order to get more complete information about the changes occurring in a well. For example, absolute temperature data generated using the DTS assembly is combined with temperature change data generated from DAS data to calculate an absolute temperature profile at a higher temporal resolution than can be accomplished with DTS alone.

Although the DTS and DAS fibers are shown as separate optical fibers, they are not so limited. For example, a single optical fiber can be used for both DTS and DAS interrogation and reflected signals.

To generate temperature change data from DAS signal data, the DAS signal data is processed to at least partially separate acoustic effects from temperature and/or pressure effects. The interferometer signals processing methods described herein recognize that interferometer amplitudes and oscillations in the interferometer signals depend on acoustic changes as well as temperature changes. For example, an interferometer signal generated by detected reflected signals from laser pulses into a single mode fiber can be represented by:

$$S = A\exp\left(\frac{i4\pi L n(1-\varepsilon(t))}{\lambda}\right)$$

where A is a constant, L is the laser pulse width, n is the index of refraction of the fiber, $\varepsilon(t)$ represents acoustic signals, $\lambda$ is the interrogation signal wavelength and t is time. The index of refraction of a DAS fiber can be represented by:

$$n = n_0 + \frac{dn}{dT}\Delta T.$$

Combining these equations yields:

$$S = A\exp\left(\frac{i4\pi L\left(n_0 + \frac{dn}{dT}\Delta T\right)(1-\varepsilon(t))}{\lambda}\right)$$

which can be further represented by:

$$S = A*\exp\left(\frac{i4\pi L}{\lambda}\right)n_0 * \exp\left(\frac{i4\pi L}{\lambda}\frac{dn}{dT}\Delta T\right) *$$
$$\exp\left(\frac{i4\pi L}{\lambda}n_0\varepsilon(t)\right) * \exp\left(\frac{i4\pi L}{\lambda}\frac{dn}{dT}\Delta T\varepsilon(t)\right),$$

where A is a constant, the first exponential ("exp") function is a constant, the second exp function is the fringes due to temperature changes ($\Delta T$), the third exp function is the fringes due to acoustics ($\varepsilon(t)$), and the fourth exp function represents fringes due to both $\Delta T$ and $\varepsilon(t)$.

Temperature changes cause relatively long period oscillating signals in the DAS signals, while acoustic sources cause relatively short period signals. For example, temperature changes are considered to cause signals that are predominately around one second or greater, and acoustic signals are considered to cause signals with periods that are less than around one second. This consideration is used to separate temperature effects from acoustic effects by separating different oscillation lengths. However, the last term in the equation for S also allows temperature changes to be measured by observing the amplitude modulation of the acoustic signals.

Figure 2:
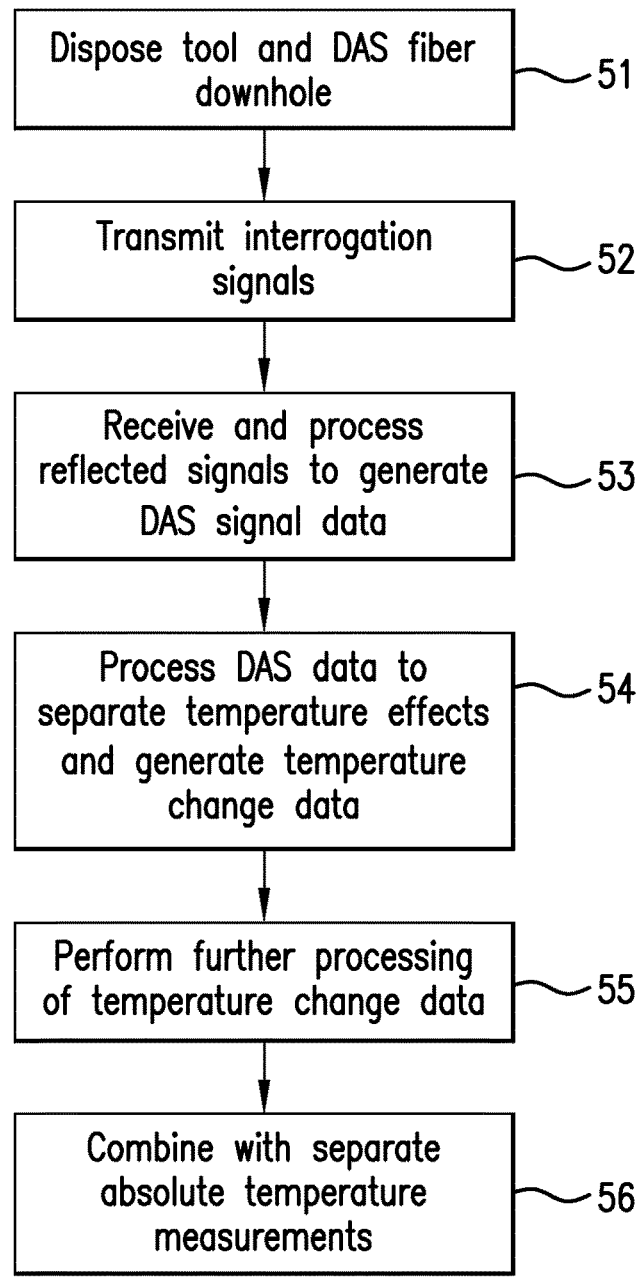
FIG. 2 is a flow chart illustrating a method of measuring temperature or other parameters based on DAS measurement data.

FIG. 2 illustrates a method 50 of monitoring vibration and/or other parameters of a downhole tool. The method 50 includes one or more of stages 51-56 described herein. The method 50 may be performed continuously or intermittently as desired, and may be performed in real time during a monitored operation. The method 50 may be performed by one or more processors or other devices capable of receiving and processing measurement data, such as the interrogation unit 28 or any processor configured to receive and process measurement data. In one embodiment, the method includes the execution of all of stages 51-56 in the order described. However, certain stages 51-56 may be omitted, stages may be added, or the order of the stages changed.

In the first stage 51, a component such as the tool 18 is lowered into or otherwise disposed in the borehole 12. A DAS optical fiber 36 is disposed with the tool 18 and extends along a length of the borehole string 14. An operation is performed, such as drilling, stimulation (e.g., hydraulic fracturing or acid stimulation), production and others.

In the second stage 52, at least one interrogation signal is transmitted into at least one optical fiber, such as the DAS fiber 36. In one embodiment, for example as part of an OTDR method, a plurality of coherent interrogation signal pulses are transmitted into the fiber sensor. Additional signals, such as DTS signals, can be transmitted into the DAS fiber 36 or onto a separate measurement optical fiber.

In the third stage 53, signals reflected from sensing locations in the optical fiber 36 are received by a reflectometer unit for each interrogation signal and/or pulse. The reflected signals are sampled to generate DAS signal data.

At this stage, the DAS signal data reflects not only acoustic changes in the optical fiber, but also other effects on the optical fiber such as temperature and pressure changes. Pressure changes are also observable through the same method as has been described for measuring temperature changes since the pressure will strain the fiber resulting in a change in the interferometer length and therefore a change in the DAS signal that is not due to an acoustic source.

In the fourth stage 54, the DAS signal data is processed to identify and estimate temperature effects on the system. This processing is performed to separate the effects on the DAS data from acoustic changes from effects due to temperature changes.

In one embodiment, the DAS signal data is sampled or averaged over a selected time interval based on a selected oscillation period of temperature changes. For example, the DAS data is sampled at one second intervals, one second intervals of the data are averaged, or a low pss filter applied, or otherwise statistically calculated.

After processing to separate temperature effects, the separated or processed DAS signal is further processed to transform the fringes shown by the separated DAS signal 62 into temperature values. This can be performed by any suitable transform or other technique.

For example, the long period fringes of separated DAS data are converted into interferometer phase data by taking a Hilbert transform and unwrapping its complex phase. This can be represented by:

$$\Delta T = \frac{\lambda \Phi}{4\pi L \left(\frac{dn}{dT}\right)}.$$

In the fifth stage 55, the temperature data estimated from DAS data is optionally further processed to generate additional temperature information. In one embodiment, the DAS temperature data is analyzed by performing mathematical and/or statistical analysis of the temperature data.

For example, since the temporal sampling of the DAS is so high, temperature traces derived from DAS data can be differentiated to show temperature changes. The temperature change differentials can be performed for any selected resolution. This may be used to locate, e.g., regions of warmback after an acid stimulation. This may also be used to monitor the location of different fluids in a well if they each have even slightly different temperatures.

It is noted that the embodiments described herein are not limited to use with acid or other stimulation processes, but may be used with any process (e.g., drilling, production) or in any circumstance where temperature measurements can be performed.

In the sixth stage 56, the DAS temperature data is correlated, combined or otherwise used with other temperature measurement data to generate absolute temperature profiles or data. In one embodiment, absolute temperature measurements such as those taken from DTS measurements or discrete sensors are compared to or combined with the DAS temperature change measurements to provide absolute temperature data at a higher resolution than is typically achievable with the absolute temperature measurements alone.

In addition to temperature parameters and acoustic information, other information can be obtained from the DAS data. Such additional information includes, but is not limited to, deformation, pressure and/or fluid properties.

In one embodiment, pressure values can be determined based on the DAS data. Pressure response of the DAS fiber can be isolated or separated from the temperature and acoustic effects. For example, DAS temperature data for a selected time and depth region can be correlated with DAS temperature data at other regions to identify changes in pressure or fluid flow. Thus, pressure or flow changes can be detected over small time spans (e.g., less than one second). Due to the high speed of sound in fluids, pressure changes will propagate through the wellbore much more rapidly than temperature changes. This nearly simultaneous response along the fiber may be used to distinguish pressure changes from temperature changes.

The systems and methods described herein provide various advantages over prior art techniques. The systems and methods provide a mechanism to measure temperature changes (and other parameter changes) at small time scales, e.g., time scales of about one second or more. This is contrasted with conventional DTS systems, which average temperature over many minutes. In addition, the embodiments described herein provide for combining temperature change data with absolute temperature measurements to generate temperature profiles having a high resolution compared to other absolute temperature measurement techniques and systems.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of measuring temperatures, comprising:
   taking distributed acoustic sensing (DAS) measurement data by transmitting interrogation signals into an optical fiber disposed in an environment of interest, and receiving reflected signals over a selected time period from the optical fiber;
   processing the DAS measurement data to separate components of the DAS data associated with changes in temperature; and
   generating a temperature change profile for the selected time period based on the separated components of the DAS data.

2. The method of claim 1, wherein processing includes selecting a plurality of adjacent time windows in the selected time period, each time window corresponding to amplitude modulations associated with changes in temperature.

3. The method of claim 2, wherein each time window corresponds to a period of low frequency oscillations of the DAS measurement data associated with changes in temperature.

4. The method of claim 1, further comprising taking at least one absolute temperature measurement within the selected time period by a temperature sensor disposed in the environment of interest, and generating an absolute temperature profile for the selected time period based on the at least one absolute temperature measurement and the temperature change profile.

5. The method of claim 1, wherein the reflected signals are interference signals, and processing the DAS measurement data includes separating relatively long period oscillating signal components from relatively short period oscillating signal components.

6. The method of claim 5, wherein processing includes associating the relatively long period components with changes in temperature, and associating the relatively short period components with acoustic changes.

7. The method of claim 1, wherein the environment of interest is a borehole in an earth formation.

8. The method of claim 1, further comprising separating components of the DAS measurement data associated with pressure changes from the components associated with changes in temperature to identify changes in fluid pressure incident on the optical fiber.

9. The method of claim 8, wherein separating the components associated with pressure changes includes:
generating a first temperature profile for a first time period based on the DAS measurement data for the first time period, the first time period associated with a first region of the optical fiber;
generating a second temperature profile for a second time period based on the DAS measurement data for the second time period, the second time period associated with a second region of the optical fiber;
identifying differences between the first temperature profile and the second temperature profile; and
associating the differences with a change in fluid pressure.

10. The method of claim 9, wherein identifying the differences includes determining whether changes in the DAS data propagate at a speed consistent with pressure changes.

11. A system for measuring temperatures, comprising:
a distributed acoustic sensing (DAS) measurement device including an optical fiber configured to be disposed in an environment of interest and an interrogation unit configured to transmit interrogation signals and receive reflected signals over a selected time period from the optical fiber;
a processor configured to receive DAS measurement data generated based on the reflected signals, the processor configured to perform:
processing the DAS measurement data to separate components of the DAS data associated with changes in temperature; and
generating a temperature change profile for the selected time period based on the separated components of the DAS data.

12. The system of claim 11, wherein processing includes selecting a plurality of adjacent time windows in the selected time period, each time window corresponding to amplitude modulations associated with changes in temperature.

13. The system of claim 12, wherein each time window corresponds to a period of low frequency oscillations of the DAS measurement data associated with changes in temperature.

14. The system of claim 11, further comprising a temperature sensor configured to be disposed in the environment of interest and take at least one absolute temperature measurement within the selected time period, the processor configured to generate an absolute temperature profile for the selected time period based on the at least one absolute temperature measurement and the temperature change profile.

15. The system of claim 11, wherein the reflected signals are interference signals, and processing the DAS measurement data includes separating relatively long period oscillating signal components from relatively short period oscillating signal components.

16. The system of claim 15, wherein processing includes associating the relatively long period components with changes in temperature, and associating the relatively short period components with acoustic changes.

17. The system of claim 11, wherein the environment of interest is a borehole in an earth formation.

18. The system of claim 11, further comprising separating components of the DAS measurement data associated with pressure changes from the components associated with changes in temperature to identify changes in fluid pressure incident on the optical fiber.

19. The system of claim 18, wherein separating the components associated with pressure changes includes:
generating a first temperature profile for a first time period based on the DAS measurement data for the first time period, the first time period associated with a first region of the optical fiber;
generating a second temperature profile for a second time period based on the DAS measurement data for the second time period, the second time period associated with a second region of the optical fiber;
identifying differences between the first temperature profile and the second temperature profile; and
associating the differences with a change in fluid pressure.

20. The system of claim 19, wherein identifying the differences includes determining whether changes in the DAS data propagate at a speed consistent with pressure changes.

* * * * *